Oct. 6, 1942.                     A. S. HEARD                     2,297,831
                                     BOLT
                               Filed Nov. 4, 1940
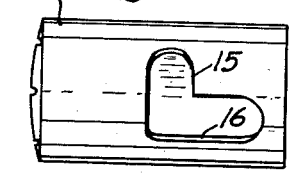
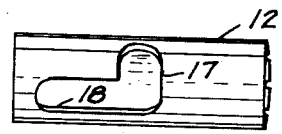
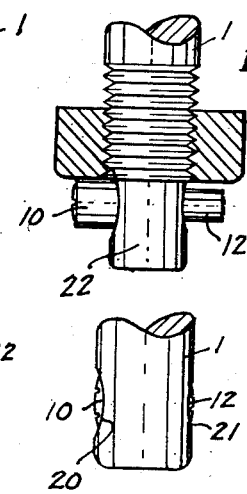
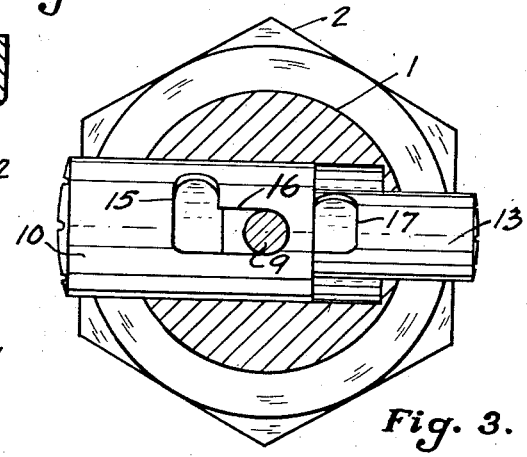
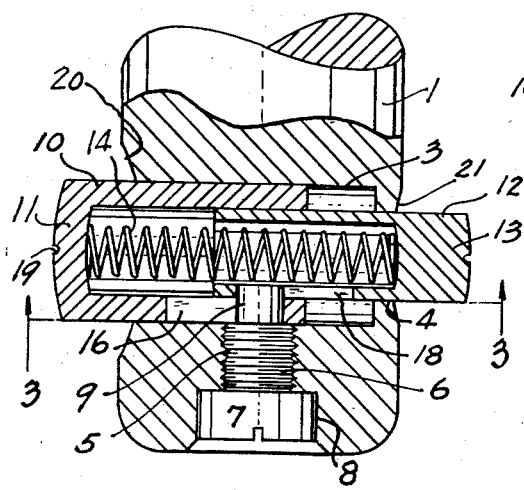
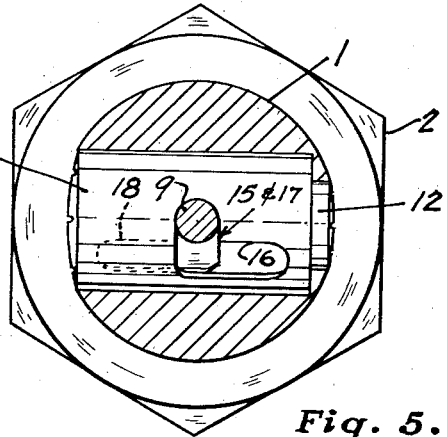
ALBERT S. HEARD
Inventor:
By James L. Givnan
Attorney.

Patented Oct. 6, 1942

2,297,831

UNITED STATES PATENT OFFICE 2,297,831

BOLT

Albert Sidney Heard, Banks, Oreg.

Application November 4, 1940, Serial No. 364,150

1 Claim. (Cl. 151—6)

This invention relates to improvements in bolts of various kinds and more particularly to means for preventing the accidental or unintentional removal of a bolt or the removal of a nut from the bolt.

The principal object of the invention is the provision of simple, efficient, durable and inexpensive means permanently attached to the bolt which serves the purpose of a cotter pin.

The invention comprises a pair of pins yieldingly protruding from the bolt in alignment with each other and compressable with respect to each other and to the bolt. The combined length of both pins when telescoped and fully compressed is less than the diameter of the bolt and may be temporarily held in this compressed position so that the nut may be normally advanced or retarded on the threads of the bolt. When the pins are released into their extended positions in the path of movement of the nut they provide positive means for preventing removal of the nut from the bolt.

Another feature of the invention, particularly desirable in the logging industry, is that either projecting pin may be independently moved inwardly or compressed with respect to the bolt without disturbing the extended position of the other pin. Ordinarily in the logging industry considerable difficulty is experienced with common cotter pins attached to bolts which are applied to various parts of equipment which are dragged and bounced around in different operations. Many times the ordinary cotter pin becomes broken and lost resulting in unintentional removal of the nut, but with my invention I overcome these objections by providing a pin which is permanently attached to the bolt and which will yield under certain conditions instead of breaking as in the case of the cotter pin.

These and other objects will appear as my invention is more fully hereinafter described in the following specification, illustrated in the accompanying drawing, and finally pointed out in the appended claim.

In the drawing:

Figure 1 is a side elevation of an unthreaded bolt showing my invention operatively installed at one end thereof and disposed in an extended position.

Figure 2 is a fragmentary view of the lower end of the bolt showing the invention compressed with respect to the bolt.

Figure 3 is an enlarged sectional view taken on the line 3—3 of Figure 4.

Figure 4 is an enlarged fragmentary vertical sectional view through the lower end of Figure 1.

Figure 5 is a view similar to Figure 3 showing the invention in a compressed position.

Figure 6 is an enlarged detail view of one of the compressible elements of the invention.

Figure 7 is a detail view of a companion member adapted for slidable or telescopic engagement with the element shown in Figure 6.

Figure 8 illustrates the invention applied to a threaded bolt.

Referring now more particularly to the drawing:

Reference numeral 1 indicates the main body of a bolt having a head 2 at one of its ends. Near the opposite end of the bolt (see Figure 4) I form a transversely disposed cylindrical cavity 3 reduced at its inner end into an aperture 4. The lowermost end of the bolt is apertured and internally threaded as at 5 to receive a bolt 6 formed with a head 7 adapted to be seated in a counterbored portion 8. The upper or inner end of the bolt 6 is reduced in diameter and smooth-surfaced to form a locking pin 9. Slidably mounted within the cavity 3 is a hollow cylindrical pin 10 closed as at 11 at one of its ends, and adapted to telescopically or slidably receive a companion pin 12, closed at its outer ends as at 13. The cavities of both pins are in alignment and in open communication with each other to house a compression spring 14 whose one end bears against the end 11 of the pin 10 and the opposite end bears against the end 13 of the pin 12, thus both pins are normally held in extended positions. The pin 10 is formed with two intersecting slots 15 and 16 disposed at right angles to each other as shown. The pin 12 is formed with a pair of similar slots 17 and 18.

When the pins are slidably engaged with each other and disposed in extended positions the locking pin 9 is slidably embraced by the slots 16 and 18 as shown in Figures 3 and 4 and both pins are thus free to move under the action of the spring 14 into extended positions or may be compressed into a retracted or compressed position.

For maintaining both pins in retracted or compressed positions they are simultaneously rotated about their longitudinal axes to cause the slots 15 and 17 to engage the pin 9 which locks the pins 10 and 12 in their compressed positions as shown in Figure 5. When both pins are again rotated in a reverse direction the slots 16 and 18 are again brought into alignment with the pin 9 which allows the pins 10 and 12 to be extended by the spring 14.

For convenience in gripping the ends of the pins and rotating the same I provide slots or other serrations 19 and also form depressions 20 and 21 in the periphery of the bolt immediately surrounding the pins so they may be compressed into a position where their combined length will be less than the outside diameter of the bolt, so as not to obstruct the passage of a nut over the bolt or the passage of the bolt into or through an aperture.

In applying the invention to threaded bolts as illustrated in Figure 8, the lowermost end of the bolt is extended beyond the threads as at 22 and is of less diameter than that of the bolt so that when the pins are moved into compressed positions the nut may be freely moved over the reduced portion 22 and into engagement with the threads of the bolt.

While I have shown a particular form of embodiment of my invention I am aware that many minor changes therein will readily suggest themselves to others skilled in the art without departing from the spirit and scope of the invention. Having thus described the invention, what I claim as new and desire to protect by Letters Patent is:

A shaft having an aperture extending transversely therethrough, a pair of pins yieldingly and slidably mounted in said aperture, means for urging said pins into extended positions with respect to the shaft, means for locking the pins in compressed positions with respect to the shaft, said means comprising angularly related slots in said pins, and a locking pin slidably embraced by said slots.

ALBERT S. HEARD.